Nov. 27, 1956    B. L. GAINSFORTH    2,772,345
DENTAL SPOT-WELDER
Filed April 16, 1954
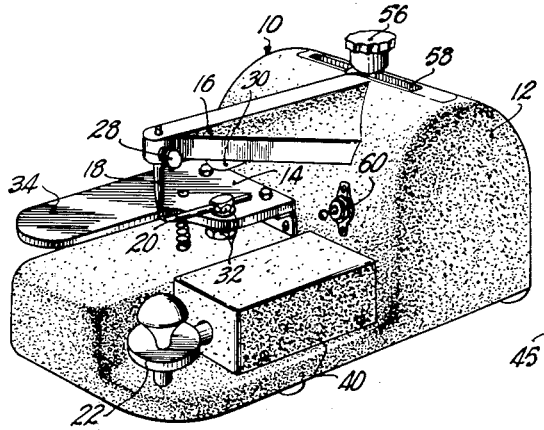
Fig. 1.
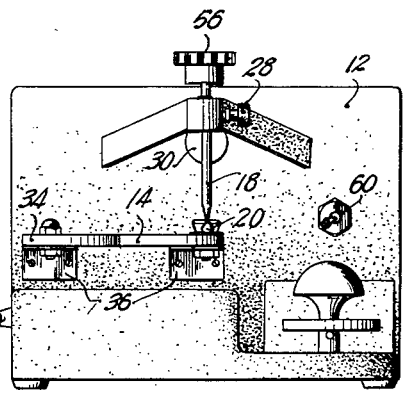
Fig. 4.
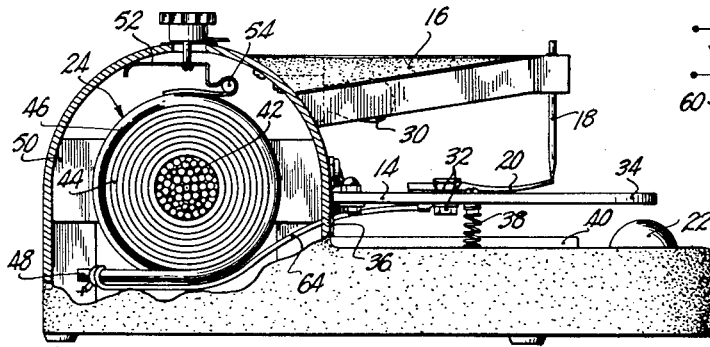
Fig. 2.
Fig. 5.
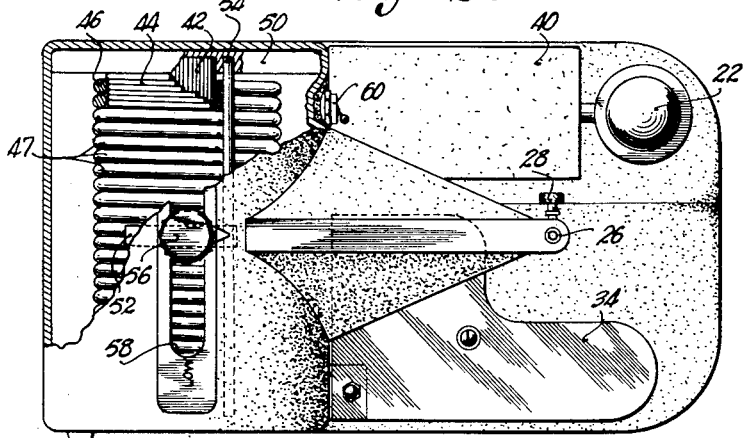
Fig. 3.
INVENTOR.
Burdett L. Gainsforth
BY
ATTORNEY.

United States Patent Office 2,772,345
Patented Nov. 27, 1956

2,772,345

DENTAL SPOT-WELDER

Burdett L. Gainsforth, Ogallala, Nebr.

Application April 16, 1954, Serial No. 423,798

4 Claims. (Cl. 219—86)

This invention relates generally to electric welding machines and more particularly to a spot-welder adapted for use by dentists and laboratory technicians in fabricating orthodontic bands, attachments, and the like.

It is the most important object of the present invention to provide, in a spot-welder, a hinged platform on which is mounted one of a pair of opposed electrodes and which serves as a hand rest so that an operator can simultaneously control the spacing between electrodes and the positioning of a work piece therebetween.

Another important object of the present invention is the provision of a tap switch adjacent the electrodes which, like the hinged platform, can be actuated conveniently by the operator to energize a welding circuit without releasing his grasp on the work piece during the welding process.

It is a further object of the present invention to provide an improved welding circuit in which the load on the source is constant despite adjusted variations in the current supplied to the electrodes, and in which such adjusted variations may be controlled much more accurately than in the similar devices heretofore provided.

With these and other objects in view, the spot-welder of the present invention generally comprises a metallic case which houses a welding transformer and on which is mounted a stationary electrode, a hinged hand rest to which is attached a second electrode, and a tap switch for energizing the welding circuit, the compact arrangement of parts being such that the electrodes can be separated, the work piece positioned and the circuit energized by the operator without the need of associated foot pedals and the like and without releasing his grasp on the work piece.

Other objects of the present invention include the provision of spring means on the platform for holding the movable electrode biased toward the stationary electrode; the adaptability of the device for carbon resistance soldering when one of the copper welding electrodes is replaced with a standard copper-clad carbon electrode; and many, more minor objects which will become apparent in the specification which follows and from a study of the appended drawing, wherein:

Figure 1 is a perspective view of a spot-welder made in accordance with the teachings of the present invention.

Fig. 2 is a side, elevational view, parts being broken away and in section to reveal details of construction.

Fig. 3 is a top, plan view, parts being broken away and in section to reveal details of construction.

Fig. 4 is an end, elevational view of the spot-welder of the present invention; and Fig. 5 is a diagram of the electrical circuit of the spot-welder shown in Figs. 1–4, inclusive.

Referring now to the accompanying drawing, the spot-welder of the present invention is broadly designated by the numeral 10, and includes, as elements thereof, a metallic casing 12, hinged platform or hand rest 14, an arm 16 which mounts stationary electrode 18, and a second electrode 20 on platform 14. A tap switch 22 is provided for energizing step-down transformer 24 after a work piece 26 has been properly positioned between electrodes 18 and 20.

The arm 16, integrally attached to casing 12 and extending laterally therefrom, has an opening 27 which receives the copper electrode 18, the latter being held in place by means of a set-screw 28. As best shown in Fig. 2, a suitable lamp 30 is provided for illuminating the area adjacent electrodes 18 and 20.

Electrode 20 is releasably attached to platform 14 by means of fastening elements 32 in such a manner that the points of the electrodes 18 and 20 are in engagement when the platform 14 is in the position shown in Figs. 1 and 2. The platform 14 has an extension 34 which, in the illustrated embodiment, is adapted to serve as a rest or support for the left hand of the operator. Platform 14 may be fabricated from any suitable non-conductive material, for example, Lucite or polystyrene, and is attached to the casing 12 by means of hinge members 36. A coil spring 38 on the platform 14 yieldably holds the platform 14 in the position shown in Figs. 1 and 2, with electrode 20 contacting electrode 18. By virtue of the non-conductive characteristics of platform 14, electrode 20 is insulated from casing 12.

After work piece 26 has been positioned between electrodes 18 and 20, switch 22 is easily accessible, and may be tapped by the operator with his right hand to energize transformer 24. A suitable protective enclosure 40 is provided for the working parts of tap switch 22, which is in the nature of a conventional telegraphic key.

Step-down transformer 24, within casing 12, has an iron core 42, a primary winding 44 and a secondary winding 46. Secondary winding 46 has terminals 48, one only of which is shown in Fig. 2, and a single layer of turns 47 which are concentrically wound about primary winding 44 substantially throughout the length of core 42. Conventional power leads 45 couple primary winding 44 with a source of power (not shown). Transformer 24 is mounted within casing 12 and supported therein by means of non-conductive frame pieces 50.

A slide contactor 52, of the configuration best shown in Fig. 2, is formed about a copper rod 54 and bears against the casing 12 at one end thereof and against secondary winding 46 at the opposite end thereof. Contactor 52 is attached to a knob 56, so that contactor 52 is reciprocable on rod 54 throughout the length of a slot 58 in casing 12.

Referring now to the circuit diagram of Fig. 5, it is seen that line voltage is applied to the primary winding only after switches 60 and 22 have been closed. A parallel connection is provided for illuminating lamp 30 when switch 60 is closed. A series welding circuit 62 includes as elements thereof secondary winding 46, contactor 52, electrode 18, work piece 26 and electrode 20. The amount of current passing through work piece 26 depends on the number of secondary turns 47 in welding circuit 62 as determined by the position of contactor 52. So far as I am aware, variations in weld current in spot-welders 10 have been achieved by tapping the primary windings, rather than the secondary winding 46, as indicated above. Manifestly, by varying the number of secondary turns 47 within welding circuit 62, a greater flexibility of heat control in work piece 26 is possible. At the same time, the resistance of primary winding 44 and, consequently, the load on the power line, remain nearly constant.

Welding circuit 62 may be traced as follows: secondary winding 46, contactor 52, casing 12, arm 16, electrode 18, work piece 26, electrode 20, insulated conductor 64 (Fig. 2) and terminal 48 of secondary winding 46.

In operation, the switch 60 is first closed to condition the circuit of primary winding 44 and to illuminate the work area. Due to the arrangement of platform 14, electrodes 18 and 20, and tap switch 22, the operator is free to use both hands in grasping work piece 26. When pressure is applied to extension 34 of platform 14, electrodes 18 and 20 are separated, and work piece 26 is properly positioned therebetween. Simultaneously with the proper positioning of work piece 26, tap switch 22 is easily accessible to the operator for actuation by his right hand. Thus, the operator is able to maintain full control of platform 14, electrodes 18 and 20, and tap switch 22 during the entire welding cycle, and is therefore able to attain a much higher degree of accuracy than is possible where foot pedals are provided for separating the electrodes 18 and 20 and for keying the welding circuit 62.

When tap switch 22 is actuated, a low voltage, high amperage pulse flows through work piece 26. The latter, by virtue of its resistance to the flow of current, becomes instantly molten at a localized spot and fuses.

Spot-welder 10 may be adapted for use in carbon-resistance soldering simply by removing electrode 18 and replacing it with a conventional copper-clad carbon electrode. Suitable electric leads (not shown) are then attached to the electrodes and, with switches 60 and 22 opened, a spot-welder 10, having the advantageous features mentioned above, may be utilized for soldering broken appliances, attachments and the like.

It is obvious that the embodiment of the present invention herein disclosed is a preferred form only and that many changes or modifications may be made therein without departing from the broad principles of the present invention. Such changes or modifications are contemplated hereby and it is, therefore, desired to be limited only by the scope of the appended claims.

Having thus described the invention, what is claimed as new and desired to be secured by Letters Patent is:

1. In a spot-welder having a casing and a welding transformer therewithin, an upper, stationary electrode on the casing; a platform having a lower electrode attached thereto and extending laterally therefrom; means pivotally attaching the platform to the casing on one side of the upper electrode for swinging movement of the lower electrode toward and away from a normal position contacting the upper electrode; a tap switch on said casing on the opposite side of the upper electrode; and conductor means coupling both electrodes and said switch with said transformer for energization of a welding circuit upon actuation of the switch when the platform is in said position.

2. In a spot-welder, a casing; a welding transformer within the casing, said transformer including a primary winding and a secondary winding having a plurality of concentric turns and an upper, stationary electrode on the casing; a platform having a lower electrode attached thereto; means mounting the platform on the casing for swinging movement of the lower electrode toward and away from a position contacting said upper electrode; a tap switch on said casing, said switch being series-coupled with said primary winding; a series welding circuit including said secondary winding and said electrodes; and means in said circuit for varying the amount of current flowing therein, said means including a contactor slidably engaging said secondary winding and structure mounting the contactor for reciprocation relative to said secondary winding intermediate its ends whereby to vary the number of turns in said circuit, the upper electrode being coupled with said contactor, the lower electrode being coupled with one end of the secondary winding.

3. In a spot-welder having a casing and a welding transformer therewithin, an arm extending from the casing; a first electrode; releasable means attaching said first electrode to said arm in depending relationship thereto; a platform having an extension thereon adapted to support one hand of an operator, said extension being spaced laterally in one direction from said arm; a second electrode; releasable means attaching said second electrode to said platform; means pivotally mounting said platform on the casing for swinging movement of the second electrode toward and away from a position contacting said first electrode therebeneath, said platform being swingable downwardly away from said position when pressure is applied to said extension by the operator; and a tap switch on said casing for energizing said transformer, said switch being spaced laterally from said arm in the opposite direction and adapted for actuation by the other hand of the operator.

4. A spot-welder as set forth in claim 3 wherein is provided yieldable means normally biasing said platform and said second electrode toward said position.

References Cited in the file of this patent

UNITED STATES PATENTS

| | | |
|---|---|---|
| 1,146,988 | Arendt | July 20, 1915 |
| 2,009,647 | Brusse et al. | July 30, 1935 |
| 2,448,865 | Crombach | Sept. 7, 1948 |